United States Patent [19]

Boyde

[11] Patent Number: 5,601,041
[45] Date of Patent: Feb. 11, 1997

[54] METHOD AND TOOL FOR QUICK REPLACEMENT OF DRILL BOOTS

[75] Inventor: James Boyde, Lloyd, Mont.

[73] Assignee: Alexander C. Johnson, Lloyd, Mont.

[21] Appl. No.: 530,668

[22] Filed: Sep. 20, 1995

[51] Int. Cl.⁶ ........................................................ A01C 5/00
[52] U.S. Cl. ............................ 111/153; 111/152; 111/175
[58] Field of Search .................................... 29/239, 426.4, 29/426.5; 111/153, 154, 155, 164, 177, 186, 189, 195, 197, 924, 926, 152; 172/122, 123, 292, 311, 611

[56]            References Cited

U.S. PATENT DOCUMENTS

| 2,376,375 | 5/1945 | Mizer | 29/239 |
| 4,086,828 | 5/1978 | Maden | 29/239 X |
| 5,014,452 | 5/1991 | Berghefer | 172/272 X |

OTHER PUBLICATIONS

Drawings from the parts manual for the Van Brunt 10 x 14 Model "LZ" Lister–type Drill, manufactured by John Deere (no date).
Drawings from the parts manual for the Van Brunt 24 x 7 Model "LZ" Lethbridge–Hoe Grain Drill, manufactured by John Deere (no date).

Primary Examiner—Terry Lee Melius
Assistant Examiner—Robert Pezzuto
Attorney, Agent, or Firm—Marger, Johnson, McCollom & Stolowitz, P.C.

[57]            ABSTRACT

A scissor-type jack is used to separate the yoke that holds a drill boot. The jack or separator is expanded to bend the yoke outward thereby allowing the drill to disengage from the yoke. A replacement boot or the repaired boot is installed in the yoke and the separator contracted until the boot reengages the yoke. The separator expands and contracts responsive to the rotation of a hexagonal head that can be rotated by a conventional socket using a ratchet.

15 Claims, 2 Drawing Sheets

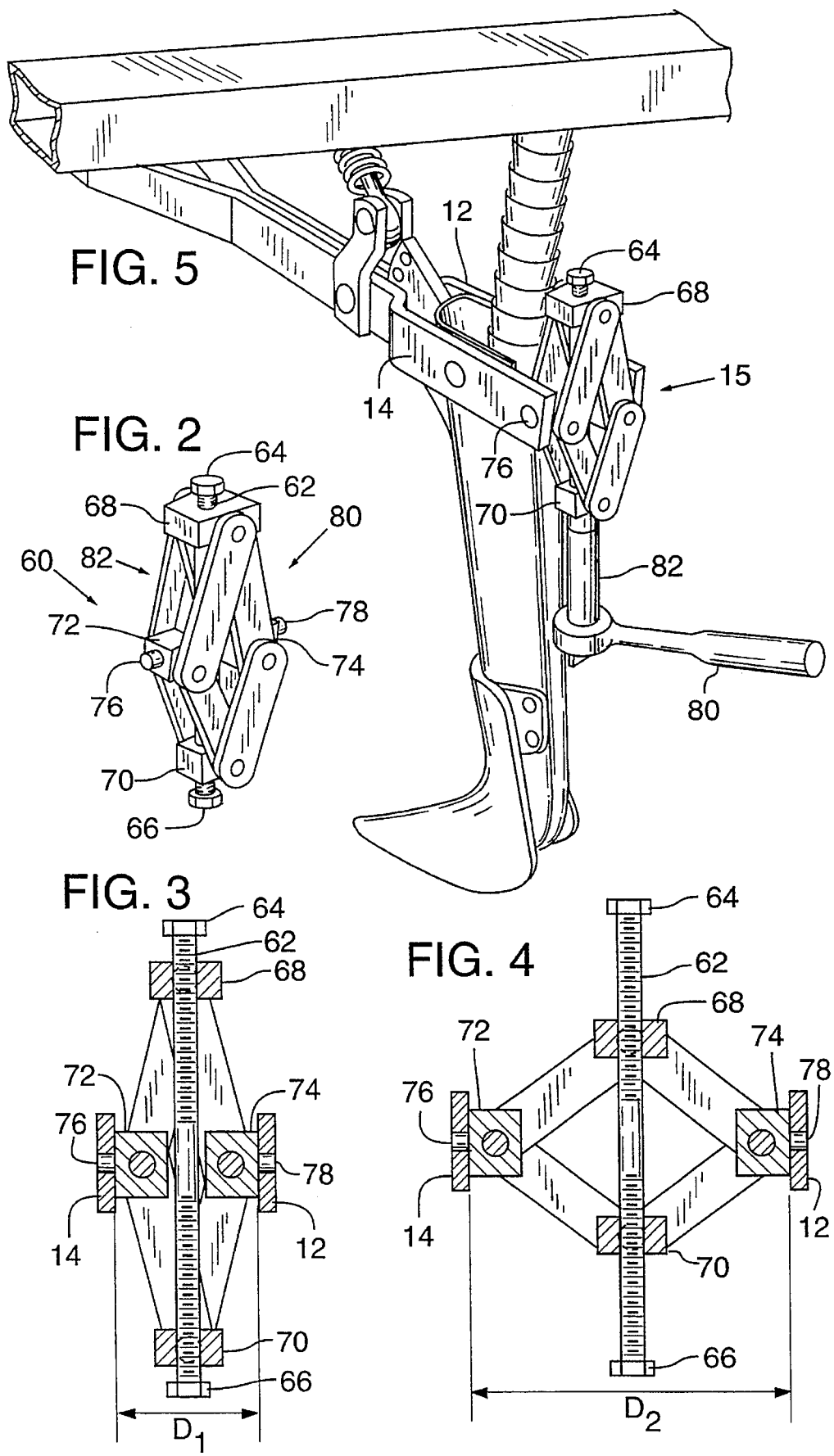

METHOD AND TOOL FOR QUICK REPLACEMENT OF DRILL BOOTS

BACKGROUND OF THE INVENTION

This invention relates generally to farm equipment and more particularly to tools and methods of repairing the drill boots.

A grain drill is a standard piece of equipment for most farming operations. A standard drill includes a grain box mounted on a frame that is pulled behind the tractor. The grain box is connected to a plurality of boots spaced apart a predetermined width along the frame. Typically, there are more than one row of these boots. The grain box is connected to the boots by means of flexible tubing. The grain box provides a metered amount of grain to the boot via the tubing. At the end of each boot is an opener, which cuts through the ground to create a furrow in which the grain is deposited. At the back end of the drill are a plurality of wheels that are aligned with the openers to press down the furrows after the grain has been deposited therein. Examples of these grain drill presses include the Van Brunt 10×14 Model "LZ" Lister-type Drill and the Van Brunt 24×7 Model "LZ" Lethbride-Hoe Grain Drill, both manufactured by John Deere.

An exploded view of a boot, a furrow opener and means for attaching the boot to a frame of a drill is shown in FIG. 1. A boot 10 is mounted to a frame of a drill (not shown) by arms 12 and 14. The arms have a first end that connects the arms to the drill and a second end that forms a yoke 15 for holding the boot 10. The boot is pivotally mounted on the yoke by two studs, one on each side of the boot 10 received in bores formed on the arms, such as bore 16 on arm 14. The arms 12 and 14 are held-together by a plurality of bolts 18, 20 and 22. The pressure of the bolts causes the arms to retain the boot therebetween. Because of the amount of force exerted on the boot by the soil, the bolts need to be securely fastened and the arms capable of sustaining this force.

A Lister-type furrow opener 24 is connected to a distal end of the boot 10 by means of two bolts 26 and 28 that extend through openings in the opener 24 and corresponding openings in the boot 10. The Listertype furrow opener 24 is but one type of opener that can be used in conjunction with the boot 10. For example, a hoe opener can be used in place thereof. A seed deflector 30 is mounted inside the boot 10 by a bolt 32 to distribute the seed evenly in the furrow created by the opener 24.

The angle of attack of the boot 10 is set by a wheel 34 pivotally mounted between the two arms 12 and 14 and being juxtaposed to the boot 10. The position of the wheel 34 is set by a pin 36 inserted into one of the plurality of bores formed in the wheel. The wheel 34 has a sloped side 38 which is in contact with the boot 10. The angle of this side 38 is set by bracing the pin 36 against the arms 12 and 14. The angle of the boot 10, which is in contact with the side 38, is set accordingly.

The arms 12 and 14, and thus the boot and opener, are attached to a frame of a grain drill (not shown) by two separate means. First, the arms 12 and 14 are connected to the frame by means of bolts 46, which are secured by cotter pins (shown but not numbered in FIG. 1). Connected only by the bolts 46 and 48, however, would allow the boot to move up and down freely and thus would not have sufficient downward force to maintain the opener in the sometimes hard and rocky soil. Accordingly, a rod 40 is mounted between the frame and the arms to provide the necessary downward force. The rod 40 is mounted between the arms 12 and 14 by means of mounting brackets 42, bolt 20 and bolt 44. A heavy duty coil spring 50 is fitted over the pin 40 to provide some shock absorber action when the opener 24 invariably hits rocky soil.

The boot 10 and opener 24 take a lot of abuse. Because the opener 24 is pulled along underground, it comes into contact with rocks and other large, sometimes immovable objects. As a result, the opener can become bent, which alters the furrow or, worse yet, the opener can become broken.

As a result of this abuse, the openers must be changed frequently. There are several methods to replace the opener. The first is to remove the pin 36 and swing the boot upright to provide access to the opener. The bolts 26 and 28 can then be manually removed by a ratchet or other tool. The problem with this approach is that the bolts become corroded and caked with mud because the opener is usually underground. As a result, the bolts are difficult, if not impossible, to remove manually. In addition, the repairman must get down on his hands and knees, typically in the mud, to access the bolts, even with the boot in an upright position. Another approach is to remove the boot 10 entirely, including the attached opener 24, and replace it with a new boot and opener. The process of removing the boot 10, however, is complicated and time-consuming because of the number of bolts used to secure the arms to the boot and to the grain drill frame. In order to remove the boot 10, bolts 18, 20, 22, 44, 46 and 48 must be removed to allow the two arms to be separated to free the boot 10 of the arms. This is a time-consuming process which is typically done during the heat of the day, and thus consumes valuable daylight, or during the cold and wet season.

Accordingly, a need remains for a method and tool for a quick replacement of drill boots.

SUMMARY OF THE INVENTION

It is, therefore, an object of the invention to provide a tool and corresponding method to offer quick replacement of drill boots.

The invention comprises a separator that can be used to perform a method for quick replacement of drill boots. The separator is a scissor-type jack that expands and contracts in response to the rotation of a threaded bolt. The method includes removing the bolt at the distal end of the distal ends of the furcations, inserting the separator between the arms in place of the bolt, and expanding the separator so that the distal ends are spread apart, flexing the furcations, until the boot is unclamped from between the two arms. The separator includes two studs on opposite sides of the separator that fit into the bore vacated by the removed bolt. In the preferred embodiment, the step of expanding the separator is performed by rotating a head of the threaded bolt by means of a conventional ratchet. Once the boot is removed, a replacement boot and opener can be inserted in place thereof and the separator contracted to allow the arms to move back to their normal position, which retains the boot therebetween. The removed bolt is then reinserted and tightened down. The removed boot can then be taken back to the shop and the bolts attaching the opener to the boot can be easily removed by a cutting torch or a hack saw.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a pictorial view of a separator according to the invention.

FIG. 3 is a cross section of the separator of FIG. 2 in a first contracted position to allow the separator to be inserted between the two drill press arms.

FIG. 4 is the separator of FIG. 2 in a second, expanded position to allow the drill boot to be released from between the two arms.

FIG. 5 is a perspective view of the separator of FIG. 2 mounted between the two arms of a drill press to release the boot in the manner according to the invention.

DETAILED DESCRIPTION

Figure 1:
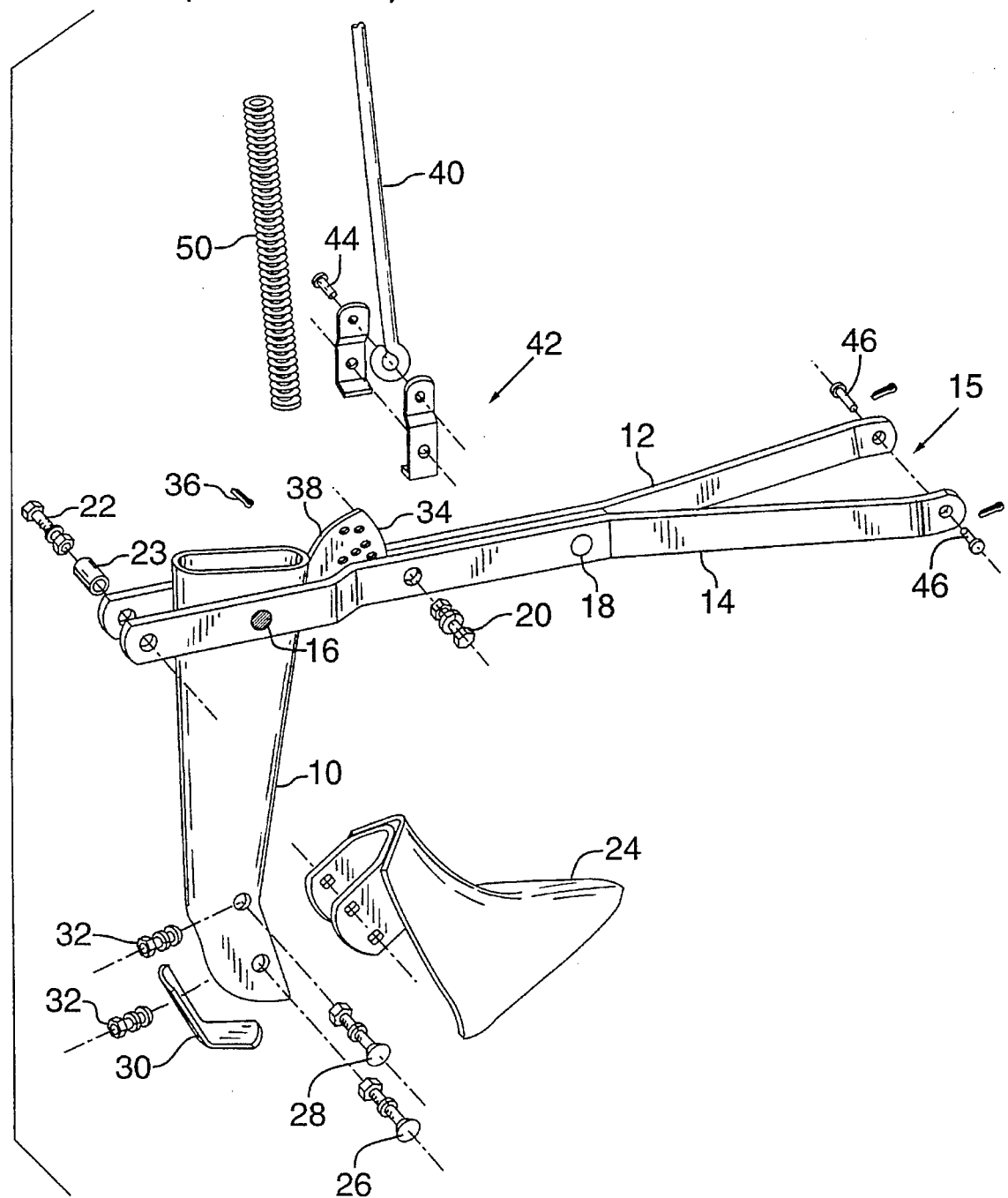
FIG. 1 is an exploded view of a prior art drill boot, the furrow opener and means for attaching the boot to a drill press frame.

Referring now to FIG. 2–4, the separator 60, which allows for quick replacement of drill boots, is shown. The separator 60 includes longitudinal bolt 62 that extends centrally through the separator. The bolt 62 is threaded at both ends and includes hexagonal heads 64 and 66 at both ends as well. The heads 66 and 68 are compatible with a conventional socket. The threaded ends are received in blocks 68 and 70, which each include a threaded bore to receive the threads of the bolt. The bolt and blocks are threaded so that in the preferred embodiment, clockwise rotation of the bolt causes the block 68 and 70 to move together (FIG. 4) and counterclockwise rotation causes the blocks to move apart (FIG. 3). Alternatively, the threads could be reversed so that the blocks move apart responsive to counterclockwise rotation of the bolts.

The separator 60 also includes two additional blocks 72 and 74 mounted on opposite sides of the bolts midway between the two threaded blocks 68 and 70. Blocks 72 and 74 have studs 76 and 78, respectively, which are used to engage the arms 12 and 14 of the drill, as described further below.

The blocks 72 and 74 are mounted between the threaded blocks 68 and 70 by means of linkages shown generally at 80 and 82. Each linkage includes four links arranged in a parallelogram, as shown in FIG. 2. The linkages 80 and 82 are secured to the blocks 68, 70, 72 and 74 by means of rivets, pins, bolts or equivalent fastening means. The fastening means, however, must allow the links to pivot thereabout responsive to the rotation of the bolts 62.

The separator 60 is used to separate the distal ends of the arms to allow the studs that hold the boot in the arms to be released therefrom, thereby allowing the boot to be quickly removed from between the arms. To remove the boot 10 from between the arms, only a single bolt 22 at the distal end of the yolk needs to be removed. Once the bolt is removed, the separator 60 is inserted between the arms so that the studs 76 and 78 engage the bores vacated by the bolt 22. The bolt 62 is then rotated in a direction that causes block 72 and 74 to move apart thereby bending the arms 12 and 14 outward, as shown in FIG. 4. This is continued until the studs that hold the boot between the arms are released from the bores in the arms. Once the studs are released from the bores, the boot slips right off. The removed boot and furrow opener can then be replaced by a replacement boot and opener and the removed boot can then be taken back to the shop and the opener removed from the boot by a cutting torch. Alternatively, the opener can be repaired right there on the spot or a more convenient location which is on the tractor, rather than requiring the repairman to slog around in the mud.

A single separator can be used to repair all of the drill boots on the drill or, alternatively, an individual separator can be mounted on the yoke of each set of arms on the drill. In the latter case, the studs 76 and 78 can be threaded to allow the separators to be bolted onto the yoke and to help secure the boot to the yoke.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A quick release drill boot comprising:

a boot for receiving grain;

an arm having a first end for attaching the arm to a frame of a grain drill and a second end having furcations (12, 14) forming a Y-shaped yoke, the boot clamped between the furcations of the yoke and mounted thereon by a pair of oppositely directed first studs engaged in a coaxial pair of first bores in the furcations, the yoke having distal ends of a predetermined spacing extending beyond the boot; and a separator mounted between the distal ends of the yoke, the separator having a contracted condition sized to fit between the distal ends and an expanded condition exceeding the predetermined spacing of the distal ends, and further including a pair of oppositely directed self-locating second studs (76, 78) on opposite sides thereof, the self-locating second studs received in a coaxial pair of second bores in the distal ends of the yoke, and a spreading mechanism for separating the furcations from the boot responsive to expansion of the separator to, spread the distal ends of the yoke apart by flexing the furcations so as to disengage the first studs from the first bores, thereby unclamping the boot from the yoke, allowing the boot to be removed from the yoke.

2. A quick release drill boot according to claim 1 wherein said separator includes a scissor-type jack having the pair of blocks (72, 74) mounted on opposite sides thereof, the blocks supporting the pair of oppositely directed self-locating second studs received in the coaxial pair of second bores in the distal ends of the yoke.

3. A quick release drill boot according to claim 2 wherein said separator includes a threaded bolt (62) extending lengthwise along the separator, the separator expanding responsive to rotation of the threaded bolt in a first direction and contracting responsive to rotation of the bolt in a second direction.

4. A quick release drill boot according to claim 3 wherein said bolt includes a head mounted on each end thereof.

5. A quick release drill boot according to claim I further including a furrow opener mounted on the boot.

6. A quick release drill boot according to claim I further including a hoe opener mounted on the boot.

7. A method of quickly removing a boot from a grain drill when the boot is attached to a grain drill by means of an arm having a first end for attaching the arm to a frame of the drill and a second end having furcations with distal ends of a predetermined spacing forming a Y-shaped yoke, wherein the boot is clamped between the furcations of the yoke (12, 14) and mounted thereon by a pair of oppositely directed first studs engaged in a coaxial pair of first bores in the furcations, and secured by a bolt (22) extending through a pair of coaxial second bores at the distal ends of the yoke, the method comprising the steps of:

inserting a separator between the distal ends of the yoke; and expanding the separator so that the distal ends spread apart flexing the furcations responsive to the expansion of the separator to unclamp the boot by disengaging the first studs from the first bores, thereby allowing the boot to slip out from between the yoke.

8. A method of quickly removing a boot from a grain drill according to claim 7, wherein the step of expanding the separator so that the distal ends spread apart responsive to the expansion of the separator to unclamp the boot by disengaging the first studs from the first bores, thereby allowing the boot to slip out from between the furcations, includes rotating the bolt in a first direction.

9. A method of quickly removing a boot from a grain drill according to claim 8 wherein the step of rotating a bolt in a first direction includes attaching a ratchet to the bolt.

10. A method of quickly removing a boot from a grain drill according to claim 7 wherein the step of inserting a separator between the distal ends of the yoke includes:

removing the bolt (22) from the pair of coaxial second bores at the distal ends of the yoke; and inserting the pair of oppositely directed self-locating second studs located on opposites sides of the separators the studs received in the coaxial pair of Second bores in the distal ends of the yoke in the pair of holes vacated by the bolt.

11. A method of quickly removing the boot from a grain drill according to claim 7 further including:

inserting a replacement boot in the yoke; and contracting the separator so that the distal ends of the yoke flex back to their original predetermined spacing whereby the replacement boot is retained in the yoke.

12. A method for quickly removing the boot from a grain drill according to claim 11 wherein the step of contracting the separator so that the distal ends of the yoke flex back to their original predetermined spacing includes rotating a bolt in a second direction.

13. A method of quickly removing a boot from a grain drill according to claim 7 further including:

removing an opener from the boot; and mounting a replacement opener on the boot.

14. A method of quickly removing a boot from a grain drill according to claim 13 wherein the step of removing the opener from the boot includes cutting off any bolts connecting the opener to the boot.

15. A method according to claim 7 wherein the spreader comprises a spreading mechanism having a contracted condition sized to fit between the distal ends of the furcations and an expanded condition exceeding the predetermined spacing of the distal ends; and a pair of blocks (72, 74) mounted on opposite sides of the spreading mechanism, the blocks supporting a pair of oppositely directed self-locating second studs (76, 78) sized for insertion into the coaxial pair of second bores in the distal ends of the yoke, to engage the tool therebetween so that the operation of the spreading mechanism spreads the distal ends apart responsive to the expanded tool, to disengage the first studs from the first bores, allowing the boot to slip out from between the furcations of the yoke.

\* \* \* \* \*